US011468710B2

(12) United States Patent
Schwetz

(10) Patent No.: US 11,468,710 B2
(45) Date of Patent: Oct. 11, 2022

(54) ALIGNMENT APPARATUS FOR VEHICLE AUTHENTICATION SYSTEM

(71) Applicant: Gentex Corporation, Zeeland, MI (US)

(72) Inventor: Ingo Schwetz, Flein (DE)

(73) Assignee: GENTEX CORPORATION, Zeeland, MI (US)

( * ) Notice: Subject to any disclaimer, the term of this patent is extended or adjusted under 35 U.S.C. 154(b) by 426 days.

(21) Appl. No.: 16/708,962

(22) Filed: Dec. 10, 2019

(65) Prior Publication Data

US 2020/0193132 A1 Jun. 18, 2020

Related U.S. Application Data

(60) Provisional application No. 62/778,933, filed on Dec. 13, 2018.

(51) Int. Cl.
| | | |
|---|---|---|
| *G06K 9/00* | (2022.01) | |
| *G06V 40/18* | (2022.01) | |
| *B60R 25/25* | (2013.01) | |
| *G02F 1/163* | (2006.01) | |
| *G06V 40/16* | (2022.01) | |

(52) U.S. Cl.
CPC .......... *G06V 40/193* (2022.01); *B60R 25/252* (2013.01); *B60R 25/255* (2013.01); *G02F 1/163* (2013.01); *G06V 40/168* (2022.01); *G02F 2203/11* (2013.01)

(58) Field of Classification Search
CPC .. G06V 40/193; G06V 40/168; B60R 25/252; B60R 25/255; G02F 1/163; G02F 2203/11
See application file for complete search history.

(56) References Cited

U.S. PATENT DOCUMENTS

| | | | |
|---|---|---|---|
| 5,928,572 A | 7/1999 | Tonar et al. | |
| 5,998,617 A | 12/1999 | Srinivasa et al. | |
| 6,020,987 A | 2/2000 | Baumann et al. | |
| 6,037,471 A | 3/2000 | Srinivasa et al. | |
| 6,137,620 A | 10/2000 | Guarr et al. | |
| 6,141,137 A | 10/2000 | Byker et al. | |
| 6,193,912 B1 | 2/2001 | Thieste et al. | |
| 6,241,916 B1 | 6/2001 | Claussen et al. | |
| 6,249,369 B1 | 6/2001 | Theiste et al. | |

(Continued)

FOREIGN PATENT DOCUMENTS

| | | |
|---|---|---|
| DE | 102017123139 A1 | 4/2018 |
| WO | 9842796 | 10/1998 |
| WO | 9902621 | 1/1999 |

*Primary Examiner* — Gregory M Desire
(74) *Attorney, Agent, or Firm* — Price Heneveld LLP; Brian James Brewer

(57) ABSTRACT

An authentication apparatus includes a scanning apparatus and an alignment apparatus. The scanning apparatus includes a sensor configured to capture identifying information of the user in a field of view. The alignment apparatus includes a housing forming an interior region comprising a viewing aperture positioned proximate to the scanning apparatus. The viewing aperture defines an alignment region intersecting the field of view in an exterior region. A first indicator is positioned in the interior region aligned with the alignment region along an alignment axis of the viewing aperture. The first indicator is configured to emit a first light into the alignment region through the aperture.

19 Claims, 6 Drawing Sheets

(56) References Cited

U.S. PATENT DOCUMENTS

| | | | |
|---|---|---|---|
| 6,519,072 B2 | 2/2003 | Nishikitani et al. | |
| 7,210,782 B2 | 5/2007 | Imaoka et al. | |
| 10,031,214 B2 * | 7/2018 | Rosenzweig | G02B 26/0858 |
| 10,372,982 B2 * | 8/2019 | McDonald | G06V 40/19 |
| 10,481,393 B2 * | 11/2019 | Border | G02B 27/283 |
| 10,929,698 B2 * | 2/2021 | Bosma | H04N 5/23238 |
| 2016/0300108 A1 * | 10/2016 | Willis | G06V 40/19 |
| 2016/0374550 A1 | 12/2016 | Stevens et al. | |
| 2017/0182975 A1 * | 6/2017 | Mönig | B60R 25/24 |
| 2018/0143073 A1 | 5/2018 | Goldring et al. | |
| 2018/0189950 A1 * | 7/2018 | Norouzi | G06N 3/0454 |
| 2020/0193132 A1 * | 6/2020 | Schwetz | G06V 40/67 |

\* cited by examiner

ALIGNMENT APPARATUS FOR VEHICLE AUTHENTICATION SYSTEM

CROSS-REFERENCE TO RELATED APPLICATIONS

This application claims priority under 35 U.S.C. § 119(e) and the benefit of U.S. Provisional Application No. 62/778,933 entitled ALIGNMENT APPARATUS FOR VEHICLE AUTHENTICATION SYSTEM, filed on Dec. 13, 2018, by Ingo Schwetz, the entire disclosure of which is incorporated herein by reference.

TECHNOLOGICAL FIELD

The present disclosure generally relates to an authentication or identification system and, more particularly, to an alignment apparatus for an identification system.

SUMMARY OF THE DISCLOSURE

According to one aspect of the present disclosure, an authentication apparatus is disclosed. The apparatus comprises a scanning apparatus and an alignment apparatus. The scanning apparatus comprises a sensor configured to capture identifying information of the user in a field of view. The alignment apparatus comprises a housing forming an interior region comprising a viewing aperture positioned proximate to the scanning apparatus. The viewing aperture defines an alignment region intersecting the field of view in an exterior region. An indicator is positioned in the interior region aligned with the alignment region along an alignment axis of the viewing aperture. The indicator is configured to emit light into the alignment region through the aperture.

According to another aspect of the disclosure, a method for aligning an object within a field of view of a scanning apparatus is disclosed. The method comprises emitting a first light emission along an alignment axis intersecting with a central portion of the field of view. The method further comprises outputting the first emission through an aperture of an alignment apparatus. The aperture of the alignment apparatus forms an alignment region surrounding a focal point of the field of view. The method further comprises emitting a plurality of secondary light emissions from the alignment apparatus, wherein the secondary light emissions are offset from the alignment axis, and outputting the secondary light emissions through the aperture, wherein first light emission visually indicates the alignment of the field of view.

In yet another aspect of the disclosure, an alignment apparatus for an authentication system is disclosed. The authentication system comprises a scanning apparatus comprising a sensor configured to capture identifying information of the user in a field of view. The alignment apparatus comprises a housing forming an interior region comprising a viewing aperture and positioned proximate to the scanning apparatus. The viewing aperture defines an alignment region intersecting the field of view in an exterior region outside the housing. The alignment apparatus further comprises a first indicator positioned in the interior region and offset from the viewing aperture. The first indicator is configured to emit a first light emission along an alignment axis intersecting a central portion of the field of view and defining an alignment region intersecting the field of view outside of the housing. The alignment apparatus further comprises at least one second indicator disposed in the interior region and offset from the alignment axis. The at least one second indicator is configured to emit a second emission. The offset of the secondary emission from the alignment axis in relation to a location of the viewing aperture defines a viewing angle of the secondary light emissions such that the second light emission is visible about a perimeter of the field of view through the viewing aperture.

These and other features, advantages, and objects of the present disclosure will be further understood and appreciated by those skilled in the art by reference to the following specification, claims, and appended drawings.

DETAILED DESCRIPTION

Figure 1:
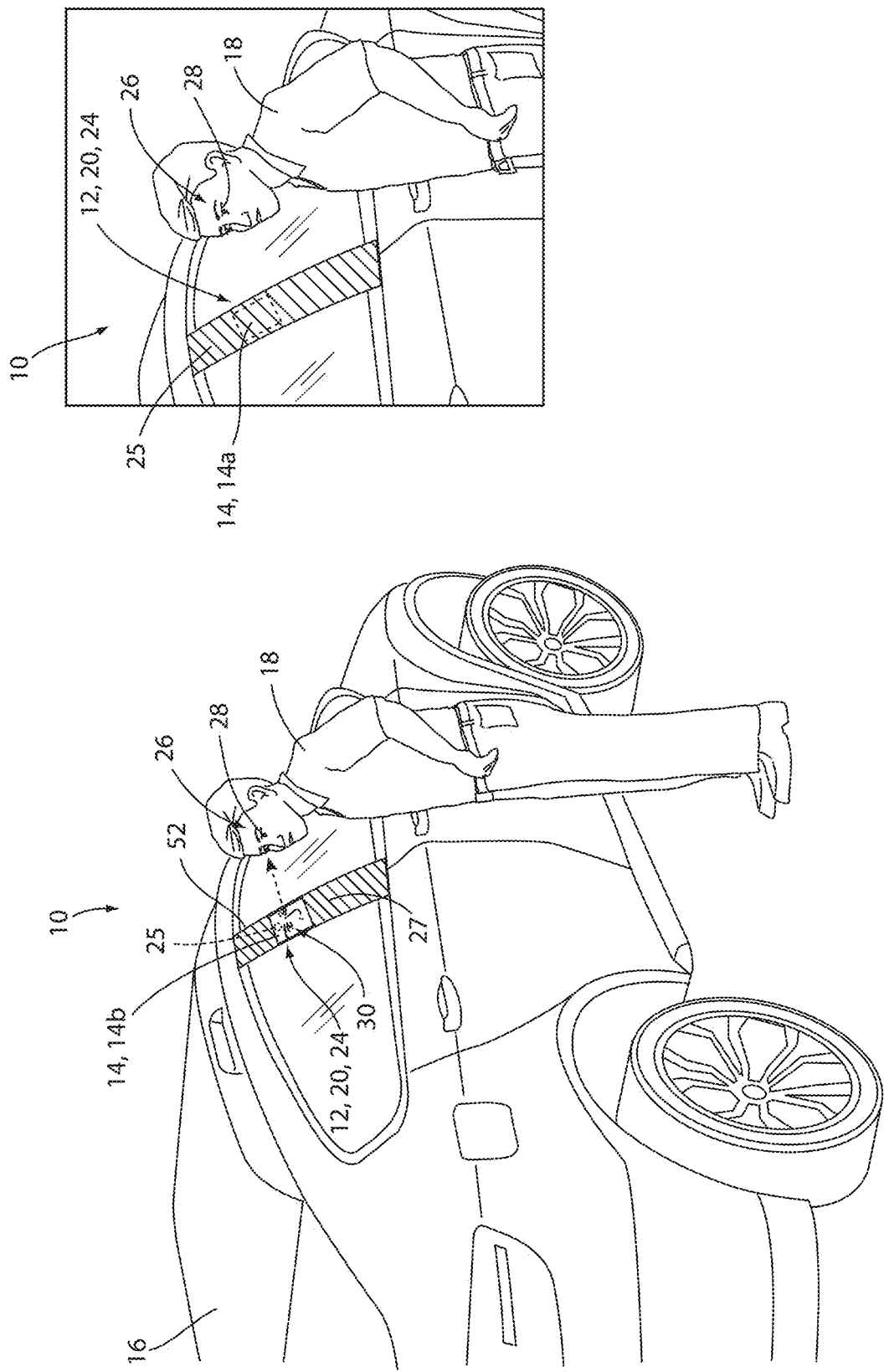
FIG. 1 is an illustrative view of an authentication system comprising a scanning apparatus and a concealment apparatus incorporated in an automotive vehicle.

For purposes of description herein, the terms "upper," "lower," "right," "left," "rear," "front," "vertical," "horizontal," and derivatives thereof shall relate to the disclosure as oriented in FIG. 1. It is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
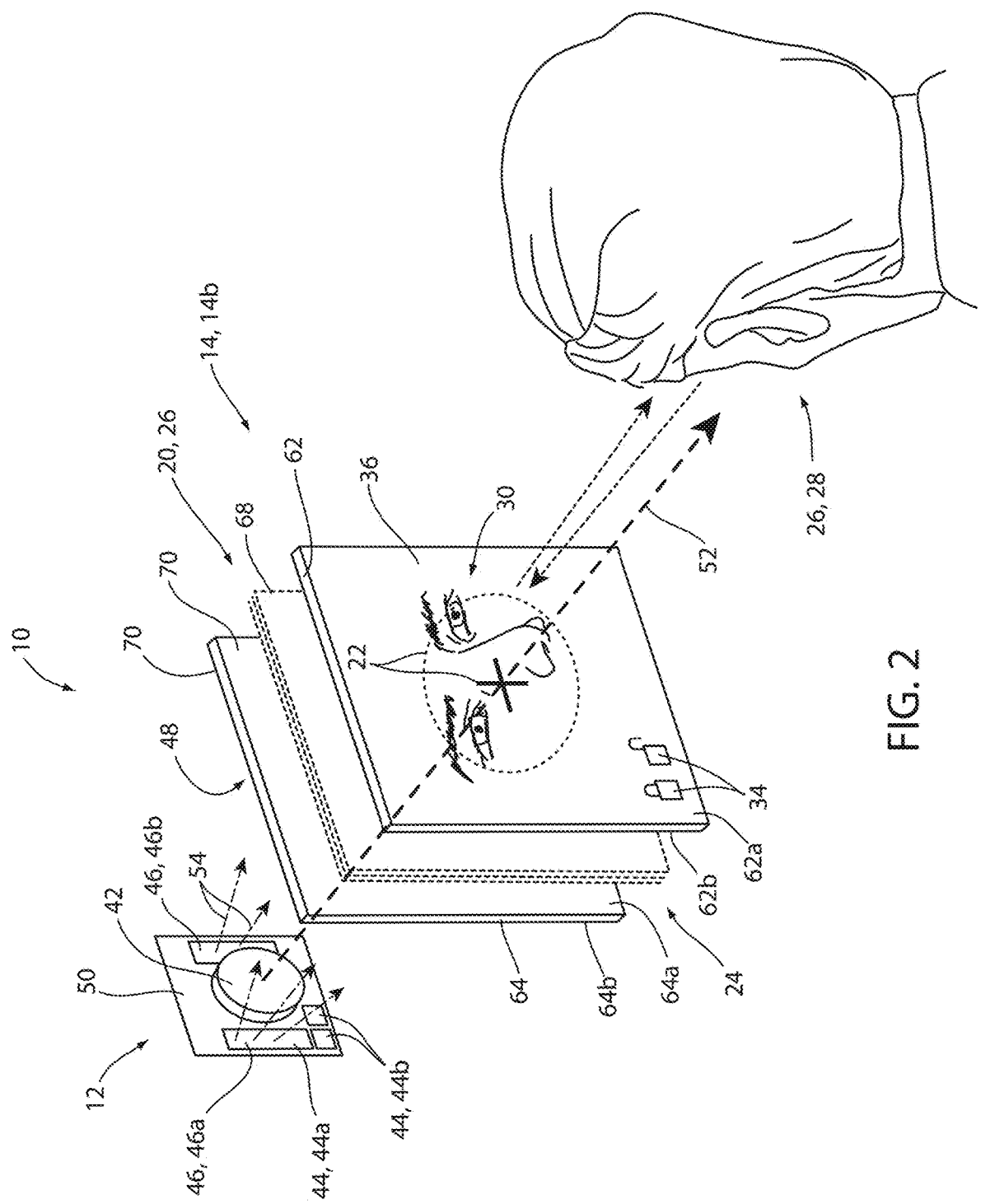
FIG. 2 is a cross-sectional view of a scanning apparatus and a concealment apparatus.

Referring to FIGS. 1 and 2, the disclosure provides for an authentication system 10 comprising a scanning apparatus 12 and a concealment apparatus 14. As shown in FIG. 1, the system 10 is incorporated in an automotive vehicle 16. However, the system may be implemented in a variety of settings to provide authentication for access to barriers or entry doors, authorization of transactions (e.g. banking transactions, purchases, etc.), and various additional applications that may benefit from secure authorization of a user 18. Additionally, the concealment apparatus 14 may provide for the location of the scanning apparatus to be concealed, such that the appearance of the scanning apparatus 12 does not detract from the environment in which the system 10 is incorporated. In some embodiments, the concealment apparatus 14 may be configured to change from a concealed configuration 14a to a scanning configuration 14b.

In some embodiments, the scanning apparatus 12 may be disposed or incorporated in various portions of the vehicle 16 to provide access to various compartments or portions of the vehicle 16. For example, the user 18 may be authorized to access a trunk of the vehicle to receive a delivery or collect an item. In this way, the system 10 may provide for selective access through one or more gates, doors, or access panels and may be additionally operable to provide an authorization for a user to complete various operations or transactions. Accordingly, the scanning apparatus 12 may be incorporated in various portions of the vehicle 16 (e.g. a pillar, trunk, spoiler, hood, roof, etc.) or various other structures for convenient incorporation in a variety of environments. The various beneficial aspects of the system 10 are further discussed in the following detailed description.

In operation, the scanning apparatus 12 may be operable to perform an identification function, which may be activated upon detection of the user 18 interacting or being detected proximate to the scanning apparatus 12. Once activated, a controller of the system 10 may control an electro-optic device 20 to change a transmittance of the concealment apparatus 14. In response to the activation, the controller may apply a control to an electrical signal (e.g. a voltage potential) applied to the electro-optic device to change the electro-optic device 20 from a substantially opaque state in the concealed configuration 14a to a substantially transparent or light transmissive state in the scanning configuration 14b. In this way, the controller may selectively reveal the location of the scanning apparatus 12, such that the user 18 may align one or more identifying features (e.g. a face, iris, fingerprint, palm print and outline, etc.) with the scanning apparatus 12. Accordingly, the system 10 may be configured to be selectively revealed to the user 18 to process an authentication or identification routine.

In some embodiments, the concealment apparatus 14 may additionally comprise an alignment feature 22. The alignment feature 22 may be provided in the form of a mirror device 24, which may be selectively revealed in the scanning configuration 14b. In some implementations, the alignment feature 22 may further comprise an alignment apparatus 25. The alignment apparatus 25 may be positioned behind the mirror device 24 relative to the user 18. In this configuration, the alignment apparatus 25 may emit at least one alignment emission through the mirror device and/or an alignment or viewing aperture positioned proximate to the scanning apparatus 12. In this way, the alignment apparatus 25 may be configured to emit light in one or more colors indicating that the user 18 is aligned or misaligned within a field of view of the scanning apparatus 12. The alignment apparatus 25 is further discussed in reference to FIGS. 3 and 4.

The mirror device 24 may be incorporated or formed as a constituent layer of the electro-optic device 20 as shown in FIG. 2. The mirror device 24 may provide for a visual alignment tool for the user 18 to align a facial feature 26, eye 28, and/or various identifying features with the scanning apparatus. For example, the user 18 may view a reflection 30 of the identifying feature in the mirror device 24 to align the feature with the scanning apparatus 12. In some embodiments, the mirror device 24 may comprise one or more alignment features 22 as well as light indicators 34, which may assist the user 18 to align the reflection 30 of the identifying feature and indicate a status of the authentication processed by the system 10, respectively.

In the concealed configuration 14a, the system 10 may be configured to control the concealment apparatus 14 to match an appearance of a panel 27, which may be located neighboring or adjacent to the concealment apparatus 14. As shown in FIG. 1, the concealment apparatus 14 may be controlled by the controller of the system 10 to adjust a state of the electro-optic device 20 to a substantially opaque condition to achieve the concealed configuration 14a. In the concealed configuration 14a, an exterior surface 36 of the concealment apparatus 14 may be darkened to an opaque color, which may correspond to one or more chemical properties of an electro-optic medium 68 of the electro-optic device 20. In an exemplary embodiment, the electro-optic device 20 may be configured to transition from a black appearance in the concealed configuration 14a to a comparatively transparent appearance in the scanning configuration 14b. In this way, the controller of the system 10 may be configured to adjust the appearance of the exterior surface 36 to change from a colored appearance that substantially matches the panel 27 to a light transmissive state configured to reveal the mirror device 24. Accordingly, the system 10 may provide for the mirror device 24 to be selectively revealed to assist the user 18 in alignment with the scanning apparatus 12.

Referring now to FIG. 2, in some embodiments, the scanning apparatus 12 may provide for the system 10 to identify or authenticate the user 18 of a vehicle 16 based on the eye-scan identification function. The eye-scan-identification function may utilize an infrared illumination of an iris of the eye 28 in order to illuminate the eye 28 for the identification. Such illumination may be optimized in conditions allowing for a high optical transmittance in the near-infrared (NIR) range. In some embodiments, the disclosure may provide for an electrochromic (EC) stack of the electro-optic device 20 that may have a high light transmittance in the NIR range, for example, wavelengths of light ranging from 800 nm to 940 nm. In some embodiments, the range of wavelengths may comprise a range from approximately 700 nm to 940 nm. Additionally, in some implementations, the electro-optic device 20 may comprise a plurality of light sources 44 configured to illuminate at least one iris of the user 18 of the vehicle 16.

To provide for the eye-scan-identification function, for example, an iris scan, an image sensor 42 of the scanning apparatus 12 may be disposed proximate to a rear surface of the electro-optic device 20. The image sensor 42 may correspond to, for example, a digital charge-coupled device (CCD) or complementary metal-oxide-semiconductor (CMOS) active pixel sensor, although may not be limited to these exemplary devices. The image sensor 42 may be in communication with at least one light source 44, which may correspond to one or more infrared emitters 44a configured to output an emission 54 of light in the NIR range (e.g. 700 nm to 940 nm, 750 nm to 800 nm, etc.). In some embodiments, wavelengths ranging from 750 nm to 800 nm may be utilized for the emission or 750 nm to 800 nm to suit one or more iris recognition functions. In this configuration, the image sensor 42 may be configured to selectively activate the one or more infrared emitters 44a corresponding to the at least one light source 44 to illuminate the iris, such that an identity of a user 18 of the vehicle 16 may be determined.

The infrared emitters 44a or the light sources 44 may correspond to a plurality of infrared emitter banks. Each of the infrared emitter banks 46 may comprise a plurality of light emitting diodes, which may be grouped in a matrix or otherwise grouped and disposed behind a rear surface 48 of the electro-optic device 20. In an exemplary embodiment, the plurality of light sources 44 may correspond to a first emitter bank 46a and a second emitter bank 46b. In this configuration, each of the emitter banks 46 may be configured to output the emission 54 in the NIR range or other wavelengths of light from the exterior surface 36. In this configuration, the scanning apparatus 12 may be configured to illuminate the eye 28 or eyes of the user 18, such that the image sensor 42 may capture image data including details of the iris or irises.

In an exemplary embodiment, each of the first emitter bank 46a and/or the second emitter bank 46b may correspond to more or fewer LEDs or banks of LEDs. In some embodiments, the electro-optic device 20 and the mirror device 24 may have a high level of transmittance in the NIR range. Examples of electro-optic assemblies having a high level of transmittance in the NIR range may correspond to assemblies comprising the mirror device 24 having a transflective dielectric coating disposed on a fourth surface of the electro-optic device as further disclosed herein. In some embodiments comprising an electro-optic device 20 having a lower level of transmittance in the NIR range, the scanning apparatus 12 may utilize a greater number of or more intense LEDs. Electro-optic assemblies having a lower level of transmittance in the NIR range may correspond to assemblies comprising the mirror device 24 having a metal-based, transflective coating disposed on a third surface of the electro-optic device.

The image sensor 42 may be disposed on a circuit 50, for example, a printed circuit board in communication with a controller. The controller may further be in communication with various devices that may be incorporated in the vehicle 16 via the communication bus or any other suitable communication interface. The controller may correspond to one or more processors or circuits, which may be configured to process image data received from the image sensor 42. In this configuration, the image data may be communicated from the image sensor 42 to the controller. The controller may process the image data with one or more algorithms configured to determine an identity of the user 18 of the vehicle 16. Further detailed discussion of the controller and the various devices that may be in communication therewith are discussed in reference to FIG. 5.

The alignment feature 22 may be formed as a portion of the mirror device 24 and may be visible by the user viewing the exterior surface 36 of the concealment apparatus 14 in the scanning configuration 14b. In this configuration, a field of view of the image sensor 42 may be directed in a detection direction 52 configured to capture reflected light from detection emissions 54 output from the infrared emitters 44a. The alignment feature 22 may be aligned with the field of view of the image sensor 42 along the detection direction 52, such that the user 18 may align the identifying feature (e.g. the facial feature 26, eyes 28, etc.) with the field of view of the image sensor 42 by aligning the reflection 30 of the identifying features with the mirror device 24. The alignment feature 22 may correspond to one or more shapes or patterns that may be visible in the reflection 30. In an exemplary embodiment, the alignment feature 22 may be etched or laser ablated into the mirror device 24. In this configuration, the system 10 may provide for visible markers on the exterior surface 36 enabling the user to align the identifying features (e.g. the facial features 26, eyes 28, etc.).

The indicators 34 may be in communication with the controller and configured to output a signal to identify a state of the scanning apparatus 12. The indicator 34 may correspond to or be aligned with the light sources 44, which may correspond to visible light sources 44b. The visible light sources 44b may be operable to flash and/or change colors to communicate a state of the scanning apparatus 12. In an exemplary embodiment, the indicators 34 may be aligned with one or more etched or laser-ablated portions of the mirror device 24, such that visible light from the visible light sources 44b may pass through the mirror device 24 and illuminate the indicators 34. The visible light sources 44b may comprise light emitting diodes (LED), and, in an exemplary embodiment, the visible light sources 44b may correspond to a red, green, and blue (RGB) LED operable to identify the state of the scanning apparatus 12 by outputting one or more colored emissions of light.

Still referring to FIG. 2, the mirror device 24 may form a portion of the electro-optic device 20. The mirror device 24 may include a first substrate 62 having a first surface 62a and a second surface 62b. The mirror device 24 may further comprise a second substrate 64 having a third surface 64a and a fourth surface 64b. The first substrate 62 and the second substrate 64 may define a cavity 66 and may be substantially parallel. The first surface 62a and the third surface 64a may be oriented toward the exterior surface 36 of the concealment apparatus 14. The second surface 62b and the fourth surface 64b may be oriented toward the rear surface 48. In this configuration, the contents of the housing, including the image sensor 42 and the light source(s) 44, may be significantly hidden from view by the concealment apparatus 14.

The cavity 66 may contain an electro-optic medium 68, such as, but not limited to, an electrochromic medium. The cavity 66 may be completely or partially filled with the medium 68. The concealment apparatus 14 may be in communication with a dimming controller via electrical contacts and may comprise various seals to retain the medium 68 in the cavity 66. In this configuration, the concealment apparatus 14 may correspond to an electrochromic mirror element configured to vary in reflectivity in response to a control signal received from the dimming controller via the electrical contacts. The control signal may change an electrical potential supplied to the concealment apparatus 14 to control the reflectivity. In some embodiments, the mirror device 24 may be implemented as a transflective coating 70, which may typically be disposed on the third surface 64a. The transflective coating 70 may typically comprise a layer containing silver along with additional layers, such as metal, dielectric and/or transparent, conducting oxides located above or below the silver comprising layer or both.

In some embodiments, the transflective coating 70 may be implemented as a transflective dielectric coating that may be applied to the fourth surface 64b. The transflective dielectric coating may be used as an alternative to a metal-based coating for the transflective coating 70. The transflective dielectric coating may be designed to resolve the issues related to the limited transmission in the NIR range for the concealment apparatus 14 and provide NIR transmittance greater than about 20%. The dielectric coating is designed to attain a reflectance level comparable to industry standard, i.e., about 40% to 85%, or about 50% to 75%, or about 55% to 70%. Additionally, the dielectric coating can be designed to attain a neutral color appearance in the visible color range for normal incidence viewing angle up to broad viewing angles. In this way, the disclosure provides for improved transmittance in the NIR range while maintaining visible color performance and mirror functionality.

Figure 3:
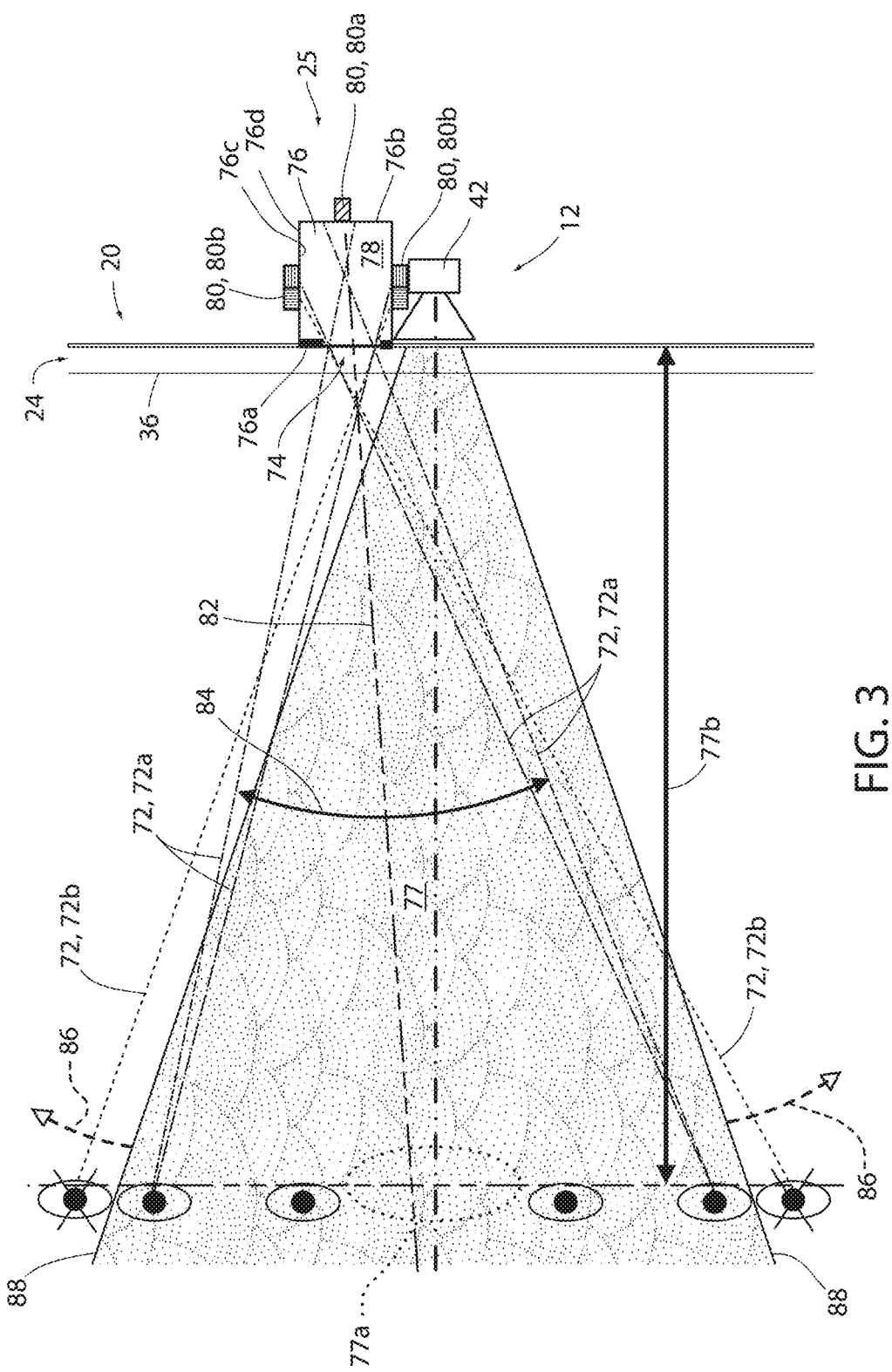
FIG. 3 is a schematic diagram of an alignment apparatus configured to emit a visible indication of an alignment with the scanning apparatus.
Figure 4:
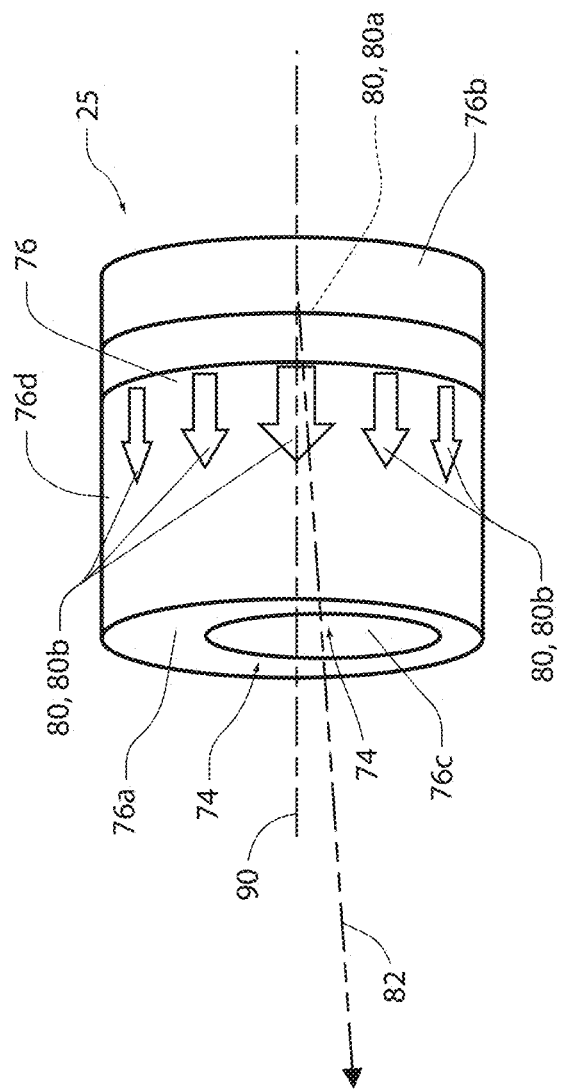
FIG. 4 is a perspective view of an example of an alignment apparatus.

Referring now to FIGS. 3 and 4, the alignment apparatus 25 is shown. Though referred to as a singular alignment apparatus, the alignment apparatus 25 may be implemented as a plurality of alignment apparatuses and/or may comprise a plurality of alignment features. An example of multiple alignment features is discussed in reference to FIG. 5. As previously discussed, the alignment apparatus 25 may be positioned proximate to and/or offset from the scanning apparatus 12. As shown, the alignment apparatus 25 may be located behind the mirror device 24 and the concealment apparatus 14 relative to the user 18. In this configuration, the alignment apparatus 25 may emit at least one alignment emission 72 through the mirror device 24 and/or an alignment or viewing aperture 74 positioned proximate to the scanning apparatus 12. In this way, the alignment apparatus 25 may be configured to emit light in one or more colors indicating that the user 18 is aligned or misaligned with a field of view 77 of the scanning apparatus 12.

As demonstrated in FIG. 3, the alignment apparatus 25 may comprise a housing 76 forming the viewing aperture 74. The housing 76 may comprise a cylindrical body extending from the mirror device 24 at a first end portion 76a to a second end portion 76b, which may form a distal end relative to the user 18. Though described in reference to the cylindrical example shown in FIGS. 3 and 4, the alignment apparatus 25 may be implemented in a variety of shapes and geometries, which may be configured to control or define the extents of an alignment region within the field of view 77 as further discussed in reference to FIG. 5. Between the first end portion 76a and the second end portion 76b, the body of the housing 76 may form an interior region 78, which may correspond to a substantially enclosed volume. The interior region 78 may be defined by a longitudinal wall 76d extending from the first end portion 76a to the second end portion 76b. In this configuration, the housing 76 may be configured to retain the at least one indicator 80 configured to emit the at least one alignment emission 72 from the viewing aperture 74. In this way, the alignment apparatus 25 may be configured to output a visual indication of an alignment of the user 18 within the field of view 77 of the scanning apparatus 12.

Still referring to FIGS. 3 and 4, in various embodiments, the at least one indicator 80 may comprise a first indicator 80a and at least one second indicator 80b. The first indicator 80a may be positioned on an interior surface 76c of the second end portion 76b. In this configuration, the first indicator 80a may be located opposite the viewing aperture 74 on the interior surface 76c of the first end portion 76a. The viewing aperture 74 may be positioned centrally along an alignment axis 82 extending from a first indicator 80a to a central portion 77a of the field of view 77. The central portion 77a may be positioned based on a focal distance 77b of the image sensor 42 of the scanning apparatus 12. In this configuration, a first alignment emission 72a emitted from the first indicator 80a may be emitted over an alignment region 84 formed by the intersection of the first alignment emission 72a and the field of view 77 of the image sensor 42 at the focal distance 77b. As such, the user 18 facing the alignment apparatus 25 within the field of view 77 may be able to see the first alignment emission 72a emitted from the viewing aperture 74 when located within the field of view 77 as depicted by the eyes shown in FIG. 3.

The at least one second indicator 80b may correspond to one or more misalignment indicators. In some implementations, the at least one second indicator 80b may comprise a plurality of second indicators 80b, which may be positioned on the interior surface 76c of the wall 76d formed by the body of the housing 76 between the first end portion 76a to the second end portion 76b. In this configuration, the at least one second alignment indicator may be configured to emit a second alignment emission 72b emitted from the interior region 78 of the housing 76 offset from the alignment indication region 84 about the alignment axis 82 of the alignment apparatus 25. In this configuration, at least a second alignment emission 72b emitted from the at least one second indicator 80b may be emitted over a misalignment indication region 86 formed approximately along a disjunctive union of the first alignment emission 72a and the field of view 77 of the image sensor 42 at the focal distance 77b. Accordingly, the misalignment region 86 may be emitted outside a perimeter 88 of the field of view 77. In this configuration, the user 18 facing the alignment apparatus 25 outside the field of view 77 may be able to see the second alignment emission 72b emitted from the viewing aperture 74 as illustrated by the crossed-out eyes shown in FIG. 3.

Though discussed in reference to the first indicator 80a and the second indicator 80b, the alignment apparatus 25 may comprise only the first indicator 80a or the second indicator 80b. For example, an implementation comprising the first indicator 80a may transmit only the first alignment emission 72a as a visual reference to the user 18. In this configuration, the user 18 would only receive a positive indication that the user 18 or one or more parts of the user 18 are located within the field of view 77. Similarly, an implementation comprising the second indicator 80b may transmit only the second alignment emission 72b as a visual reference to the user 18. In this configuration, the user 18 would only receive a positive indication that the user 18 or one or more parts of the user 18 are not located within the field of view 77. Accordingly, the alignment apparatus discussed herein may be implemented in a variety of ways without departing from the spirit of the disclosure.

In some embodiments, the first alignment emission 72a and the second alignment emission 72b may be emitted in different colors and corresponding different wavelengths of visible light respectively from the first indicator 80a and the second indicator 80b. In this configuration, the user may see a first color of light emitted from the alignment apparatus 25 when located in the alignment region 84 and a second color of light emitted from the alignment apparatus 25 when located in the misalignment region 86. Additionally, in some embodiments, the first indicator 80a and/or the at least one second indicator 80b may comprise illuminated symbols, which may form one or more illuminated shapes or icons. For example, as shown in FIG. 4, the at least one second indicator 80b may comprise a plurality of misalignment indicators distributed axially about the alignment axis 82 and positioned about the interior surface 76c of the wall 76d. The misalignment indicators may provide for arrows or alignment indications directed toward that field of view 77 and the alignment region 84 when viewed from the misalignment region 86. In this configuration, the indicators 80 of the alignment apparatus 25 may provide for a visual reference for the user 18 to identify the location of the field of view 77 of the image sensor 42.

Referring now to FIG. 4, in some embodiments, the viewing aperture 74 may be offset from a longitudinal axis 90 of the housing 76. The offset of the viewing aperture 74 relative to the longitudinal axis 90 may provide for an alignment of the viewing aperture along the alignment axis 82. In this configuration, the viewing aperture 74 may be centrally located along the alignment axis 82, such that the viewing aperture 74 passes the first alignment emission 72a along the alignment axis 82 to the central portion 77a of the field of view 77 at approximately the focal distance 77b. In this way, the alignment apparatus 25 may define the location of the alignment region 84 within the field of view 77.

Similarly, the proportions, shape, and position of the viewing aperture 74 may define the location of the misalignment region 86 and the corresponding path of the second alignment emission 72b outside the field of view 77.

Figure 5:
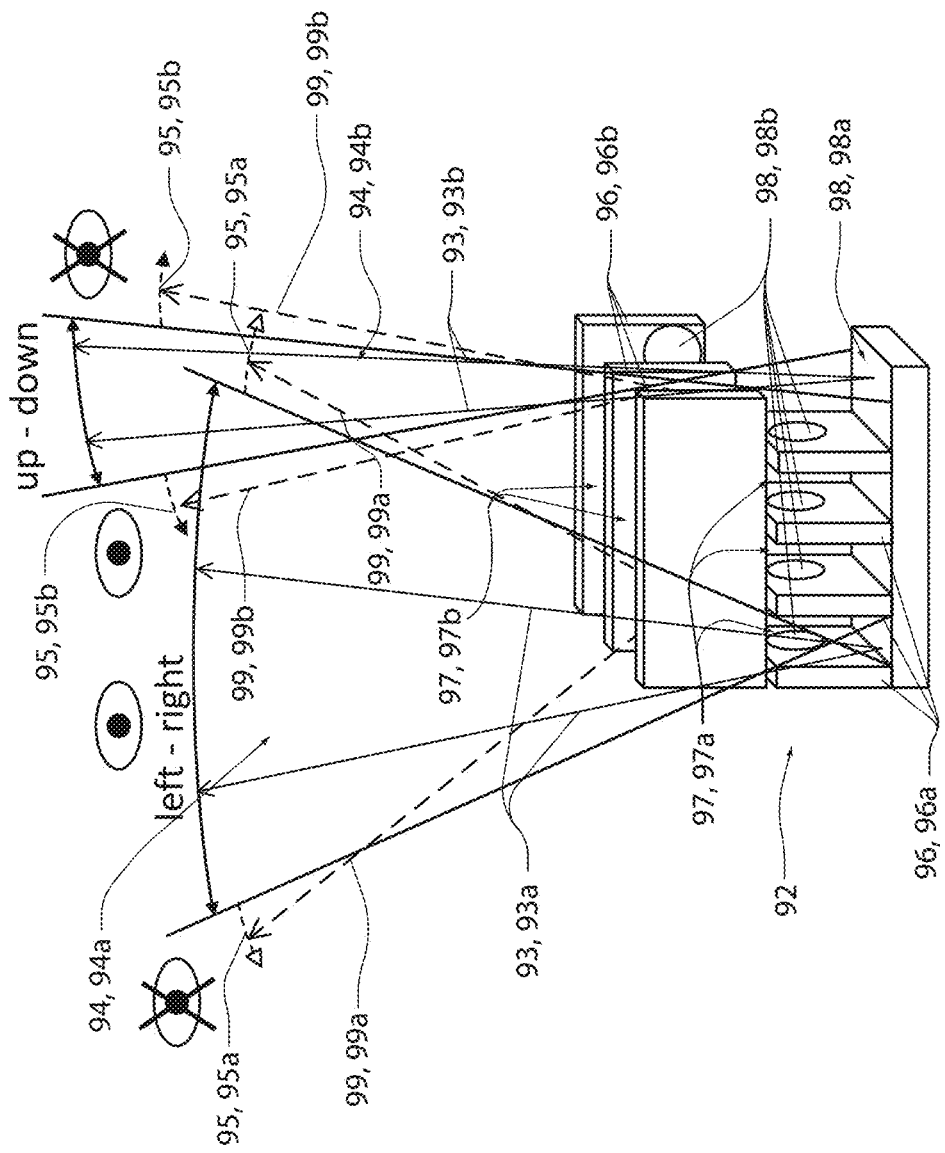
FIG. 5 is a simplified perspective view of an example of an alignment apparatus.

Referring now to FIG. 5, a simplified perspective view of an example of an alignment apparatus 92 is shown. The alignment apparatus 92 may be configured similar to the alignment apparatus 25 in that it may be configured to transmit a plurality of alignment emissions 93. Each of the alignment emissions 93 may define one or more alignment regions 94 and/or misalignment regions 95. The alignment regions 94 and the misalignment regions 95 may be defined by a plurality of partitions 96, which may form apertures 97 defining the extents of the alignment regions 94 and/or the misalignment regions 95. In this configuration, the alignment apparatus 92 may comprise a plurality of alignment features (e.g. partitions 96) configured to emit a visual indication to the user 18 identifying if the user is within one of the alignment regions 94 and/or within one of the misalignment regions 95.

In some implementations, the plurality of partitions 96 may comprise vertical partitions 96a and horizontal partitions 96b. Each of the adjacent vertical partitions 96a may be arranged on a surface of the housing 76 relative to at least one first emitter or first indicator 98a to define a horizontal aperture 97a. The horizontal aperture 97a may be configured to pass or emit a horizontal alignment emission 93a to indicate a horizontal alignment region 94a. In this way, the alignment apparatus 92 may define one or more horizontal alignment regions 94a that are indicated by light transmitted through the horizontal aperture 97a providing a visual indication to the user 18 of a location within a horizontal component of the field of view 77.

In some implementations, the adjacent horizontal partitions 96b may be arranged on a surface of the housing 76 relative to at least one first emitter 98a to define a vertical aperture 97b. The vertical aperture 97b may be configured to pass or emit a vertical alignment emission 93b to indicate a vertical alignment region 94b. In this way, the alignment apparatus 92 may define one or more vertical alignment regions 94b that are indicated by light transmitted through the vertical aperture 97b providing a visual indication to the user 18 of a location within a vertical component of the field of view 77. In such a configuration the body of the housing 76 may comprise a rectangular shape or various forms geometries, which may support the partitions 96 as discussed herein.

The misalignment regions 95 may similarly be defined by the vertical partitions 96a and/or the horizontal partitions 96b. The misalignment regions 95 may be indicated by alignment or misalignment emissions 99 (horizontal 99a, vertical 99b) from at least one second emitter or a plurality of second emitters 98b. The plurality of second emitters 98b may be positioned on the surfaces of the vertical partitions 96a to define the horizontal misalignment regions 95a and positioned on the surfaces of the horizontal partitions 96b to define the vertical misalignment regions 95b. In this configuration, each of the misalignment emissions 99 may be occluded by the partitions 96 forming the aperture 97 through which the alignment emission 93 is transmitted within the field of view 77. The misalignment emission 99 may further be transmitted through the aperture 97 defining the extents of the one or more misalignment regions 95a as discussed herein.

Figure 6:
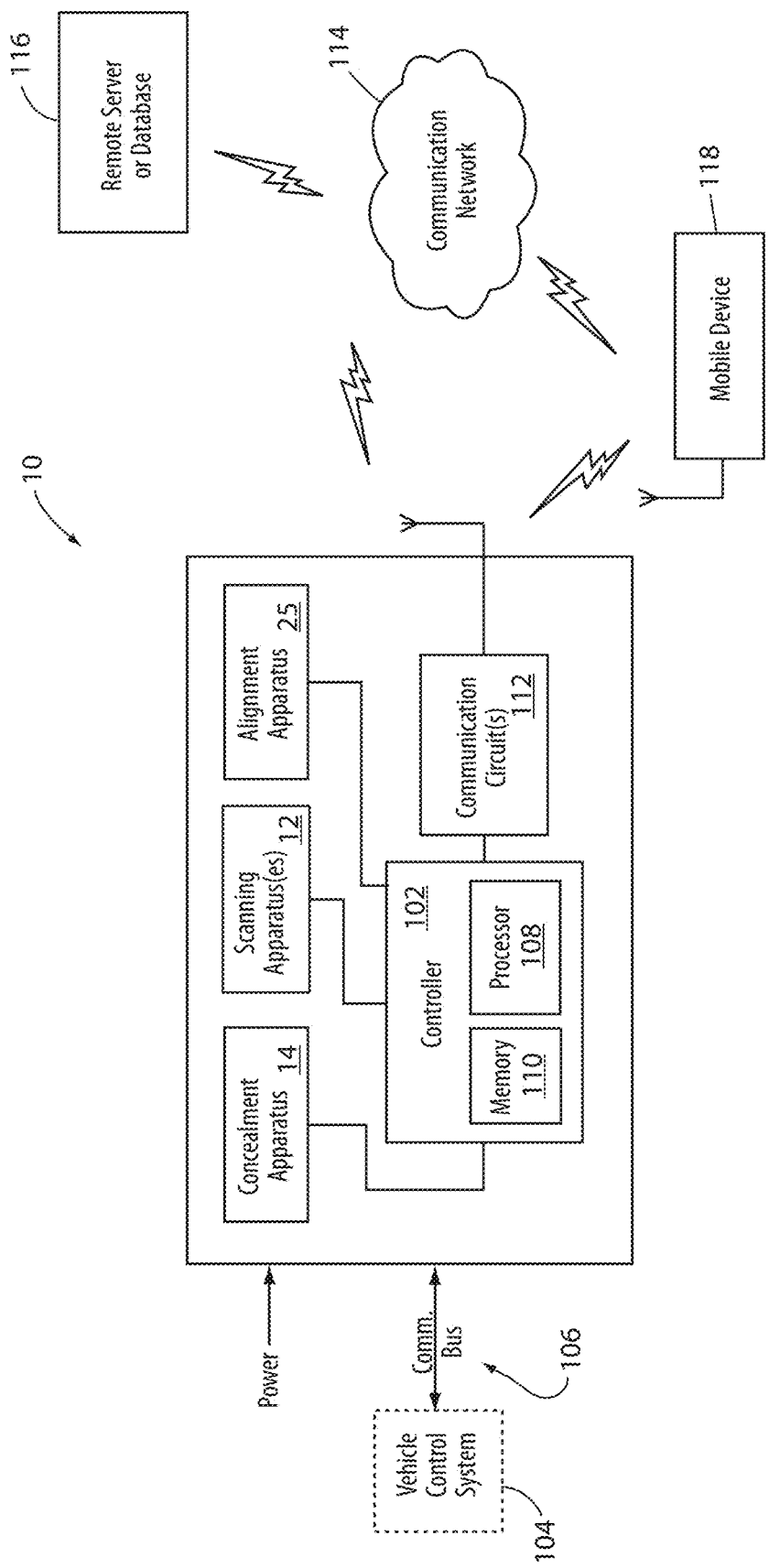
FIG. 6 is a block diagram of an identification system incorporating a scanning apparatus disposed in a mirror assembly in accordance with the disclosure.

Referring to FIG. 6, a block diagram of the system 10 incorporating the scanning apparatus 12 and the concealment apparatus 14 is shown. In FIG. 4, the controller 102 of the system 10 is shown in communication with the scanning apparatus 12 and the concealment apparatus 14. The controller 102 may further be in communication with a control module 104 via a communication bus 106 of the vehicle 16. The communication bus 106 may be configured to deliver signals to the controller 102 identifying various states of the vehicle 16. For example, the communication bus 106 may be configured to communicate to the controller 102 a drive selection of the vehicle 16, an ignition state, a door open or ajar status, a remote activation of the scanning apparatus 12, etc. Such information and control signals may be utilized by the controller 102 to activate or adjust various states and/or control schemes of the scanning apparatus 12 and the concealment apparatus 14.

The controller 102 may comprise a processor 108 having one or more circuits configured to control various operations of the system 10. The processor 108 may be in communication with a memory 110 configured to store instructions to control operations of the scanning apparatus 12. For example, the controller 102 may be configured to store one or more characteristics or profiles utilized by the controller 102 to identify the user 18 of the vehicle 16. In this configuration, the controller 102 may communicate operating and identification information with the scanning apparatus 12 to identify the user 18 of the vehicle 16. Additionally, based on the identification of the user 18, the controller 102 may be configured to control and/or communicate with additional systems of the vehicle 16. Such systems may include a security system, speed governor, radio/infotainment system, etc. In this way, one or more systems of the vehicle 16 may be controlled or restricted based on the identity of the user 18.

In some embodiments in response to an identification of a passenger or user 18 of the vehicle 16, the controller 102 may access a database of stored driver preferences to customize aspects of the vehicle 16. For example, the controller 102 may access and enable radio station presets according to a driver's pre-established preferences. Navigation and/or map display settings may be changed or set according to a driver's pre-established preferences. Additionally, the system 10 may be utilized to customize a seat position or height and adjust various operating parameters before the user 18 even enters vehicle. For example, the system may be operable to start the vehicle 16 and activate a radio to a preconfigured station or playlist, and activate a climate control to a user setting. Additionally, the database may comprise navigation information comprising known or previously visited locations. In particular, a route to home, work, or other frequently visited locations may be preset upon identification of a driver based on previous use or programming stored in the database.

In an exemplary embodiment, the controller 102 may be configured to process image data received from the image sensor 42. In this configuration, the controller 102 may process the image data with one or more algorithms configured to determine an identity of the user 18 of the vehicle 16. With the identity of the user 18 or one or more passengers of the vehicle 16 identified, the controller 102 may further be operable to control various systems or functions of the vehicle 16.

Though discussed in exemplary reference to the vehicle 16, the system 10 may similarly be implemented to authenticate users to control access or entry through doors or access gates into various buildings, office structures, residences, etc. Similarly, the system 10 may be utilized to authorize various transactions (e.g. purchases, bank transactions, etc.). For example, in a residential setting, the system 10 may be in communication with a smart-home system. In such embodiments, based on an authentication of the user 18, the system 10 may grant access to a door or gate of a home and control one or more devices in communication with the smart-home system to load specific settings or preferences of the user 18. Accordingly, the system 10 may be configured to suit a variety of applications without departing from the spirit of the disclosure.

In some embodiments, the controller 102 may utilize the identification of the user 18 of the vehicle 16 to report updates to an administrator of the system 10. For example, in some embodiments, the controller 102 may further comprise one or more communication circuits 112 configured to communicate via a communication network 114. Accordingly, the system 10 may be in communication with a remote server 116 and/or a mobile device 118 via the communication network 114. The communication network 114 may comprise one or more wireless or wired network interfaces or communication protocols. As discussed herein, wireless communication protocols may operate in accordance with communication standards including, but not limited to, the Institute of Electrical and Electronic Engineering (IEEE) 802.11 (e.g., WiFi™); Bluetooth®; advanced mobile phone services (AMPS); digital AMPS; global system for mobile communications (GSM); code division multiple access (CDMA); Long Term Evolution (LTE or 4G LTE); local multipoint distribution systems (LMDS); multi-channel-multi-point distribution systems (MMDS); RFID; and/or variations thereof. In this configuration, the controller 102 may be configured to send an alert or message to the administrator of the system 10 in response to one or more predetermined events. The alert or message may correspond to a text message, data message, or email alert via an application operating on a smart device, etc.

The electro-optic device 20 of the concealment apparatus 14 may correspond to an electrochromic element. The electrochromic element may comprise an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "Electrochromic Layer and Devices Comprising Same," U.S. Pat. No. 5,998,617 entitled "Electrochromic Compounds," U.S. Pat. No. 6,020,987 entitled "Electrochromic Medium Capable of Producing a Pre-selected Color," U.S. Pat. No. 6,037,471 entitled "Electrochromic Compounds," U.S. Pat. No. 6,141,137 entitled "Electrochromic Media for Producing a Preselected Color," U.S. Pat. No. 6,241,916 entitled "Electrochromic System, "U.S. Pat. No. 6,193,912 entitled "Near Infrared-Absorbing Electrochromic Compounds and Devices Comprising Same," U.S. Pat. No. 6,249,369 entitled "Coupled Electrochromic Compounds With Photostable Dication Oxidation States," and U.S. Pat. No. 6,137,620 entitled "Electrochromic Media With Concentration-Enhanced Stability, Process for the Preparation Thereof and Use in Electrochromic Devices"; U.S. Pat. No. 6,519,072, entitled "Electrochromic Device"; and International Patent Application Publication Nos. WO 98/42796 entitled "Electrochromic Polymeric Solid Films, Manufacturing Electrochromic Devices Using Such Solid Films, and Processes for Making Such Solid Films and Devices," and WO 99/02621 entitled "Electrochromic Polymer Systems," which are herein incorporated by reference in their entirety.

It will be appreciated that embodiments of the disclosure described herein may be comprised of one or more conventional processors and unique stored program instructions that control one or more processors to implement, in conjunction with certain non-processor circuits, some, most, or all of the functions of the concealment apparatus 14, as described herein. The non-processor circuits may include, but are not limited to, signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be understood by one having ordinary skill in the art that construction of the described disclosure and other components is not limited to any specific material. Other exemplary embodiments of the disclosure disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An authentication apparatus configured to identify a user comprising:
    a scanning apparatus comprising a sensor configured to capture identifying information of the user in a field of view, wherein the scanning apparatus further comprises an imager and a light source; and
    at least one alignment apparatus comprising:
        a housing forming an interior region comprising a viewing aperture positioned proximate to the scanning apparatus, wherein the viewing aperture defines an alignment region intersecting the field of view in an exterior region; and
        a first indicator positioned in the interior region aligned with the alignment region along an alignment axis of the viewing aperture, wherein the first indicator is configured to emit a first light into the alignment region through the viewing aperture.

2. The authentication apparatus according to claim 1, further comprising:
    at least one second alignment indicator configured to emit a second light positioned in the interior region and offset from the alignment region relative to the alignment axis.

3. The authentication apparatus according to claim 2, wherein the second alignment indicator is configured to emit the second light from the interior region through the viewing aperture outside the alignment region.

4. The authentication apparatus according to claim 2, wherein the second alignment is configured to emit the second light from the interior region through the viewing aperture, wherein the second light is occluded by a perimeter of the viewing aperture, such that the second light is occluded from view in the alignment region.

5. The authentication apparatus according to claim 2, wherein the first light comprises a first color and the second light comprises a second color different from the first color.

6. The authentication apparatus according to claim 2, wherein the at least one second alignment indicator comprises a plurality of misalignment indicators distributed axially about the alignment axis and positioned in the interior region offset from the alignment axis.

7. The authentication apparatus according to claim 6, wherein the housing comprises a cylindrical body aligned with the alignment axis and comprising the viewing aperture formed therein.

8. The authentication apparatus according to claim 7, wherein the plurality of alignment indicators comprise a plurality of directional indicators aligned with the alignment axis about a wall formed in the interior region of the cylindrical body.

9. The authentication apparatus according to claim 1, wherein the light source is configured to output a detection emission comprising an infrared or near infrared wavelength of light.

10. The authentication apparatus according to claim 1, further comprising:
    a concealment apparatus comprising an electro-optic device configured to selectively reveal a mirror element configured to reflect visible light in a detection direction.

11. The authentication apparatus according to claim 10, wherein capturing the identifying information comprises activating the light source to transmit a detection emission through the concealment apparatus and capturing a reflection of the detection emission reflected from the user back through the concealment apparatus.

12. The authentication apparatus according to claim 10, further comprising:
    a controller, wherein the controller is configured to control the concealment apparatus to conceal the alignment apparatus in a concealed configuration, wherein the electro-optic device is controlled to a darkened or opaque state.

13. A method for aligning an object within a field of view of a scanning apparatus, the method comprising:
    emitting a first light emission along an alignment axis intersecting with a central portion of the field of view;
    outputting the first emission through an aperture of an alignment apparatus, wherein the aperture of the alignment apparatus forms an alignment region surrounding a focal point of the field of view;
    emitting a plurality of secondary light emissions from the alignment apparatus, wherein the plurality of secondary light emissions are offset from the alignment axis; and
    outputting the plurality of secondary light emissions through the aperture, wherein the first light emission visually indicates an alignment of the field of view.

14. The method according to claim 13, wherein the offset of the plurality of secondary light emissions from the alignment axis in relation to a location of the aperture defines a viewing angle of the plurality of secondary light emissions.

15. The method according to claim 13, wherein the emitting the plurality of secondary light emissions comprises illuminating a plurality of directional indicators illuminated about the first emission and the alignment apparatus.

16. The method according to claim 15, further comprising:
    visually communicating a location of the field of view with the plurality of directional indicators.

17. The method according to claim 13, wherein the plurality of secondary light emissions are offset and radially distributed about the alignment axis such that the plurality of secondary light emissions are visible about a perimeter of the field of view through the aperture.

18. An alignment apparatus for an authentication system comprising a scanning apparatus comprising a sensor configured to capture identifying information of a user in a field of view, the alignment apparatus comprising:
- a housing forming an interior region comprising a viewing aperture and positioned proximate to the scanning apparatus, wherein the viewing aperture defines an alignment region intersecting the field of view in an exterior region outside the housing;
- a first indicator positioned in the interior region and offset from the viewing aperture, wherein the first indicator is configured to emit a first light emission along an alignment axis intersecting a central portion of the field of view and defining the alignment region intersecting the field of view outside of the housing; and
- at least one second indicator disposed in the interior region and offset from the alignment axis, wherein the at least one second indicator is configured to emit a second light emission, wherein the offset of the second light emission from the alignment axis in relation to a location of the viewing aperture defines a viewing angle of the second light emission, such that the second light emission is visible about a perimeter of the field of view through the viewing aperture.

19. The alignment apparatus according to claim 18, wherein the at least one second indicator comprises a plurality of misalignment indicators distributed axially about the alignment axis and positioned in the interior region offset from the alignment axis.

* * * * *